(12) United States Patent
Gupta et al.

(10) Patent No.: US 11,444,459 B2
(45) Date of Patent: Sep. 13, 2022

(54) ADAPTIVE CONTROL FOR NETWORKED RENEWABLE POWER PLANTS

(71) Applicant: VESTAS WIND SYSTEMS A/S, Aarhus N (DK)

(72) Inventors: Manoj Gupta, Vista Park (SG); Ravi Kumar, Senkang (SG); Janakiraman Sivasankaran, Sembawang (SG); Mario Dante Jardiel, Singapore (SG); Anoop Vijay Tiwari, Singapore (SG); Kouroush Nayebi, Ikast (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 213 days.

(21) Appl. No.: 16/618,689

(22) PCT Filed: May 15, 2018

(86) PCT No.: PCT/DK2018/050105
§ 371 (c)(1),
(2) Date: Dec. 2, 2019

(87) PCT Pub. No.: WO2018/219415
PCT Pub. Date: Dec. 6, 2018

(65) Prior Publication Data
US 2021/0143642 A1 May 13, 2021

(30) Foreign Application Priority Data
May 31, 2017 (DK) .............................. PA201770422

(51) Int. Cl.
*H02J 3/18* (2006.01)
*H02J 3/00* (2006.01)
(Continued)

(52) U.S. Cl.
CPC ................. *H02J 3/18* (2013.01); *G05B 15/02* (2013.01); *H02J 3/001* (2020.01); *H02J 13/00002* (2020.01)

(58) Field of Classification Search
CPC ........ H02J 3/18; H02J 3/001; H02J 13/00002; H02J 3/0012; H02J 3/381; H02J 2300/20; G05B 15/02; Y02E 10/76; F03D 7/0284
See application file for complete search history.

(56) References Cited

U.S. PATENT DOCUMENTS

| 4,677,364 A | * | 6/1987 | Williams | .............. H02J 3/1864 |
| | | | | 318/729 |
| 9,382,898 B2 | * | 7/2016 | Teodorescu | ............. H02J 3/381 |

(Continued)

FOREIGN PATENT DOCUMENTS

| EP | 2463979 A1 | 6/2012 |
| EP | 2605356 A1 | 6/2013 |

(Continued)

OTHER PUBLICATIONS

Beekmann et al., "Wind energy converters with FACTS Capabilities for optimized integration of wind power into transmission and distribution systems", 2009, IEEE Power and Energy Society. (Year: 2009).*

(Continued)

*Primary Examiner* — Mohammad Ali
*Assistant Examiner* — Kelvin Booker
(74) *Attorney, Agent, or Firm* — Patterson + Sheridan, LLP (57) ABSTRACT

There is provided a method of operating a renewable power plant that is connected to a wider power network by a bus. The method comprises: identifying a predetermined voltage condition of the renewable power plant or of the bus; controlling the renewable power plant to maintain zero (Continued)

reactive power exchange at the bus for a first period; calculating an average voltage level of the bus that was achieved during the first period; and controlling the renewable power plant to maintain the voltage output at a set voltage level for a second period, the set voltage level being substantially equal to the calculated average voltage level. The method ensures that voltage oscillations due to a push-pull phenomenon between a power plant controller and the power network do not upset the stability of the grid.

20 Claims, 6 Drawing Sheets

(51) Int. Cl.
 *G05B 15/02* (2006.01)
 *H02J 13/00* (2006.01)

(56) References Cited

U.S. PATENT DOCUMENTS

| | | | |
|---|---|---|---|
| 2010/0198421 A1* | 8/2010 | Fahimi | H02J 3/32 |
| | | | 700/291 |
| 2010/0226157 A1* | 9/2010 | Ohnishi | H02M 5/4585 |
| | | | 363/131 |
| 2012/0205981 A1* | 8/2012 | Varma | H02J 9/00 |
| | | | 307/64 |
| 2012/0280569 A1* | 11/2012 | Alam | H02J 3/381 |
| | | | 307/60 |
| 2013/0207622 A1* | 8/2013 | Yuan | G05F 1/70 |
| | | | 323/207 |
| 2014/0175908 A1* | 6/2014 | Bats | H02P 9/42 |
| | | | 307/151 |
| 2014/0354234 A1* | 12/2014 | Sudan | H02J 13/00034 |
| | | | 320/127 |
| 2015/0137520 A1 | 5/2015 | Garcia | |
| 2015/0361954 A1 | 12/2015 | Nelson et al. | |
| 2016/0149412 A1 | 5/2016 | Itaya | |
| 2017/0187189 A1* | 6/2017 | Abido | H02J 3/385 |
| 2017/0269168 A1* | 9/2017 | Lung | G01R 19/2513 |
| 2017/0314534 A1* | 11/2017 | Gupta | H02J 3/381 |
| 2020/0389030 A1* | 12/2020 | Porter | H02J 3/32 |

FOREIGN PATENT DOCUMENTS

| | | |
|---|---|---|
| EP | 2688172 A2 | 1/2014 |
| EP | 2711543 A1 | 3/2014 |
| EP | 2955809 A2 | 12/2015 |
| WO | 2011050807 A2 | 5/2011 |
| WO | 2015058769 A1 | 4/2015 |
| WO | 2015078473 A1 | 6/2015 |
| WO | 2018219415 A1 | 12/2018 |

OTHER PUBLICATIONS

Gayatri et al., "review of reactive power compensation techniques in microgrids", Feb. 19, 2016, Renewable and Sustainable Energy Reviews 81 (2018) 1030-1036. (Year: 2016).*

Krishna et al., "A review on hybrid renewable energy systems", Mar. 23, 2015, Renewable and Sustainable Energy Reviews 52 (2015) 907-916. (Year: 2015).*

PCT Notification of Transmittal of the International Search Report and the Written Opinion of the International Searching Authority, or the Declaration for PCT/DK2018/05015 dated Sep. 25, 2018.

1st Techincal examination for PA 2017 70422 dated Dec. 19, 2017.

* cited by examiner

ADAPTIVE CONTROL FOR NETWORKED RENEWABLE POWER PLANTS

TECHNICAL FIELD

The invention relates to the identification and control of renewable power plants, and in particular wind power plants, having weak interconnections with power networks that may cause instability. More specifically, the invention relates to the identification, based on a variety of indicators, of conditions that may cause instability of the power network following faults, as well as an adaptive control mode for renewable power plants to reduce the likelihood of instability.

BACKGROUND

It is important for wind power plants to provide reliable and high quality power. In particular, it is important to reduce oscillations and fluctuations in active power output, reactive power output, and/or voltage output from the wind power plant. This is because oscillations in these outputs may cause instability of power networks to which the wind power plant connects.

For example, the interconnection between a remote wind power plant and a power network may, under certain situations, be described as being a 'weak grid interconnection'. This means that small changes in reactive/active power exchange between the plant and the network may result in large voltage oscillations. The problems posed by weak grid interconnections and potential solutions to reduce unwanted oscillations caused by them are discussed in patent application no. WO 2016/062316.

In WO 2016/062316, weak grid interconnections are identified by calculating a short-circuit ratio (SCR) and comparing that SCR with a threshold. Oscillations are reduced by operating the wind power plant in a 'voltage control mode' in which reactive power is exchanged to control voltage at a given set point.

However, in some scenarios, such as the period following a grid fault, the identification of a weak grid interconnection is difficult using the methodology of WO 2016/062316.

Additionally, while the voltage control mode results in reduced oscillations in some scenarios, there are a number of scenarios in which a further reduction of such oscillations is desired.

It is an aim of the present invention to provide an improvement on the prior art.

SUMMARY OF THE INVENTION

According to an aspect of the invention, there is provided a method of operating a renewable power plant that is connected to a wider power network by a bus. The method comprises: identifying a predetermined voltage condition of the renewable power plant or of the bus; controlling the renewable power plant to maintain zero reactive power exchange at the bus for a first period; calculating an average voltage level of the bus that was achieved during the first period; and controlling the renewable power plant to maintain the voltage output at a set voltage level for a second period. The set voltage level is substantially equal to the calculated average voltage level.

Advantageously, the operation of the power plant in this manner avoids the possibility of push-pull interaction of the plant controller and grid natural voltage that results in sustained or growing voltage oscillation. The voltage oscillations occur due to a disparity between pre- and post-fault natural voltages of the grid, and the power plant controller voltage reference remaining unchanged. This is particularly beneficial as it ensures a smooth output from the power plant despite grid conditions, allows a transition from pre-fault conditions to new, post-fault conditions, and maintains stability of the grid operation.

Operating the power plant in this manner also ensures that there is a lower likelihood of a further oscillations or instability that can grow and spread in the wider grid.

The method may comprise identifying that a weak grid interconnection exists and performing the remaining steps of the method if a weak grid interconnection exists.

This method is particularly useful in relation to weak grid interconnections, where it is likely that voltage oscillation will occur.

The existence of a weak grid interconnection may be identified based upon at least one of: a short circuit ratio of the bus; the status of at least one protection system associated with the power network; and a phase angle difference between two buses within the power network.

The method may be performed following a power network fault. Identifying a predetermined voltage condition may comprise controlling the renewable power plant to maintain the voltage output at a set voltage level for a third time period. The set voltage level may be substantially equal to a pre-fault voltage level. The third time period and the second time period may be substantially similar.

It is likely that a power network fault will result in a weak grid interconnection, and so this method advantageously plans for this by initially allowing the gird to return to normal operating levels by controlling voltage output before implementing reactive power control.

The method may comprise iteratively performing the steps of: controlling the renewable power plant to maintain zero reactive power exchange at the bus for a first period; calculating an average voltage level of the bus that was achieved during the first period; and controlling the renewable power plant to maintain the voltage output at a set voltage level for a second period. The steps may be performed while monitoring for an end condition. The method may comprise reverting to a previous control mode when the end condition is detected.

Iterative performance of the method ensures that the operation of the power plant is changed gently to avoid any large changes in voltage reference level that may themselves cause problematic oscillations.

Monitoring for the end condition may comprise at least one of the following: calculating a difference between the set voltage level and the average calculated voltage of consecutive iterations and comparing the difference with a threshold range of values; calculating the number of completed iterations and comparing the number with a predetermined iterations threshold; measuring the elapsed time and comparing the measured time with a predetermined time threshold; monitoring a parameter used to identify a weak grid interconnection; or receiving commands to operate the renewable power plant in a different mode.

The duration of the second period may be reduced between at least one pair of consecutive iterations. For example, the duration of the second period may be 15 minutes for a first plurality of iterations before reducing by a minute with each consecutive oscillation. The second period may be less than 15 minutes, and may be greater than 5 seconds.

The method may comprise measuring a plurality of voltage samples. Each sample may be measured over a predetermined sample period. Calculating the average voltage level may be based on the plurality of measured voltage samples.

The duration of the first period may be shorter than the duration of the second period.

According to a further aspect of the invention, there is provided a method of operating a renewable power plant connected to a power network by a first bus, the method comprising: identifying a predetermined condition of the power network; measuring the active power output of the renewable power plant; identifying a predetermined natural voltage level of the power network that corresponds to the measured active power output; controlling the renewable power plant to maintain the voltage output at a set voltage level that is substantially equal to the natural voltage.

Identifying a predetermined condition of the power network may comprise determining at least one of: a short-circuit ratio; a phase angle difference between two buses forming part of the power network; and the status of at least one protection system associated with the power network.

Identifying a predetermined natural voltage level of the power network that corresponds to the measured active power output may comprise at least one of:

comparing the measured active power output to a pre-populated look-up table; identifying a corresponding entry in the look-up table; and reading the natural voltage level of the power network based on the identified entry in the look-up table.

The method may comprise determining a parameter selected from the following: a short-circuit ratio; a phase angle difference between two buses forming part of the power network; and the status of at least one protection system associated with the power network. Identifying a predetermined natural voltage level of the power network that corresponds to the measured active power output may comprise comparing the measure active power output and the determined parameter with the look-up table, identifying a corresponding entry in the look-up table and reading the natural voltage level of the power network based on the identified entry in the look-up table.

The method may be repeated until the predetermined condition is no longer identified and may be performed following a fault in the power network.

The bus may be a point of interconnection bus, and the two buses may comprise a point of interconnection bus and a substation bus.

The short-circuit ratio may be determined at a medium voltage bus.

The renewable power plant may comprise a wind power plant. The wind power plant may comprise a plurality of wind turbine generators.

According to an aspect of the invention, there is provided a power plant controller for a power plant having a plurality of wind turbine generators, wherein the controller comprises a processor, a memory module, and an input/output system, and wherein the memory includes a set of program code instructions which when executed by the processor, implement a method as described above.

According to an aspect of the invention, there is provided a computer program product downloadable from a communication network and/or stored on a machine readable medium, comprising program code instructions for implementing a method as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
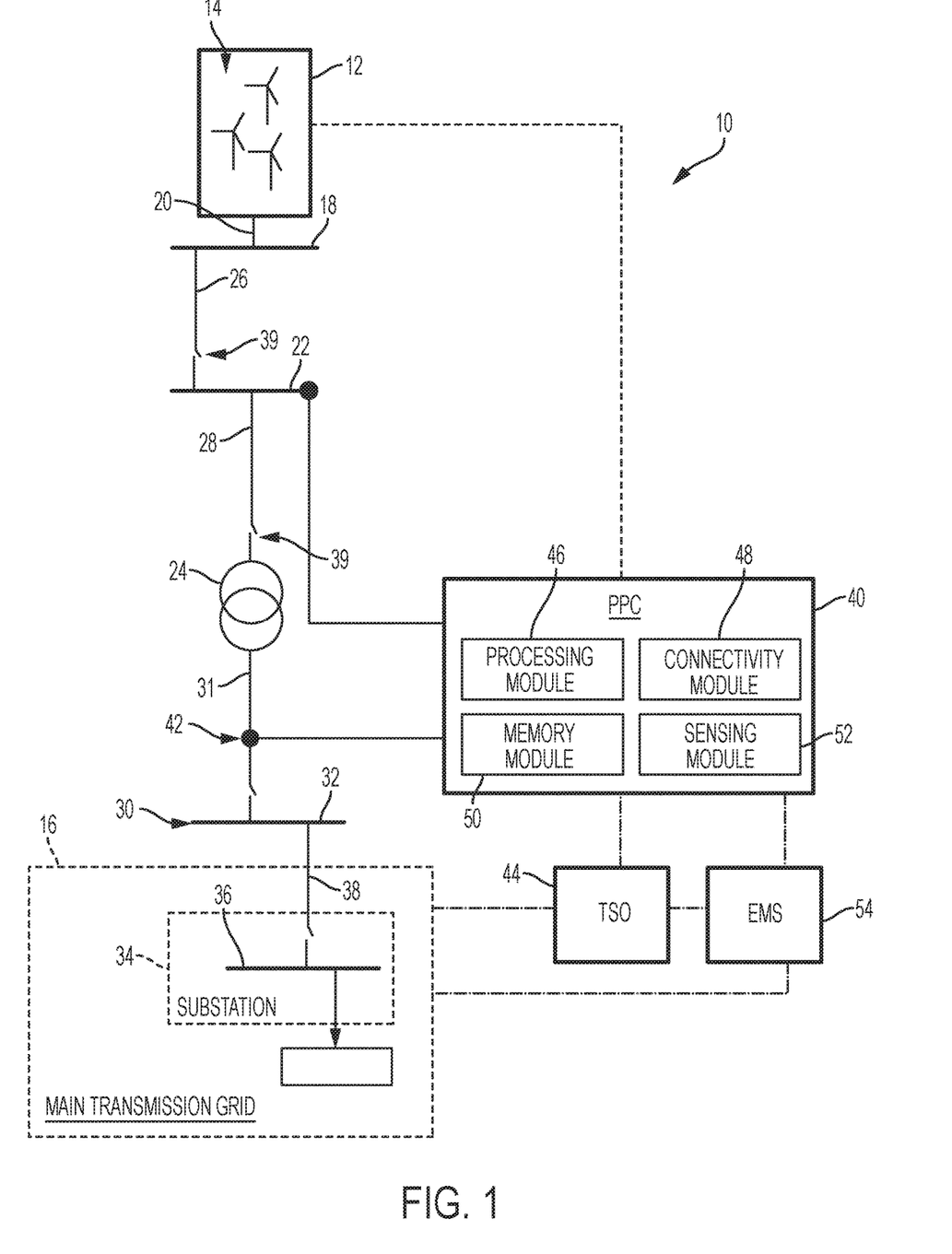
FIG. 1 is a schematic view of a power network including a wind power plant and a main power network or 'grid' according to an embodiment of the invention.

FIG. 1 illustrates a typical architecture in which a wind power plant (WPP) is connected to a main transmission grid as part of a wider power network. As will be understood by the skilled reader, a WPP comprises one or more wind turbine generator (WTG), and is also known as a wind park or a wind farm. The example shown is representative only and the skilled reader will appreciate that other specific architectures are possible, in relation to both wind power plants and power plants for other renewable energy sources. Thus, the invention also relates to renewable energy power plants in general, rather than being specific to wind power plants as in the illustrated embodiment. In addition, the skilled reader will appreciate that methods, systems and techniques also described below may be applicable to many different configurations of power network. Moreover, the components of the wind power plant and power network are conventional and as such would be familiar to the skilled reader.

It will be also be noted that FIG. 1 is a schematic view, so the way in which the control commands are transferred to WPP is not depicted explicitly. However, it will be appreciated that suitable cabling may be provided to interconnect the components of the system. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or Zig-Bee™ standards (IEEE802.11 and 802.15.4 respectively).

FIG. 1 shows a power network 10 incorporating a wind power plant (WPP) 12 including a plurality of wind turbine generators 14 or more simply 'wind turbines'. A single wind turbine would also be possible. Each of the plurality of wind turbines 14 converts wind energy into electrical energy, which is transferred from the turbines 14 to a main transmission grid 16, for distribution. Each of the wind turbines 14 of the WPP 12 is connected to a local grid (not shown).

The WPP 12 is suitably connected to a collector bus 18 via a feeder line 20. The collector bus 18 may be at a voltage level that is suitable for relatively short distance power transmission, for example in the region of 10 to 150 kV, most usually between 110 and 150 kV. The collector bus 18 may also provide a point of common coupling (PCC) for a plurality of wind power plants, although only a single WPP 12 is shown here for simplicity.

The collector bus 18 is connected to a medium voltage bus 22, which in turn is connected to a main step-up transformer 24. The collector bus 18, medium voltage bus 22 and main step-up transformer 24 are connected by transmission lines 26, 28. The main transformer 24 is in turn connected to the main grid 16 at a Point of Interconnection (PoI) 30 by another transmission line 31. The PoI 30 is an interface between the WPP 12 and the main grid 16 and comprises a PoI bus 32 whose nominal voltage level is higher than that of the collector and medium voltage buses 18, 22.

While the collector and medium voltage buses 18, 22 may be required to span distances up to around 100 km, the main grid 16 and PoI bus 32 may be an international, national, or regional grid such as the National Grid of Great Britain, for example, and therefore may be required to span distances of up to around 250 km or more. Accordingly, the voltage level of the main grid 16 and the PoI bus 32 may be much higher than the voltage level of the collector and the medium voltage buses 18, 22 for better transmission efficiency. As such, the main transmission grid 16 may comprise a plurality of substations and additional buses operating at different voltages as well as further transformers to increase the voltage for improved transfer of power. The transmission grid 16 shown in FIG. 1 includes at least one substation 34 and an associated feeder bus 36, connected to the PoI bus 32 by a transmission line 38.

The connecting lines such as the transmission and feeder lines 20, 26, 28, 31, 38 may each include a protection system 39 to protect individual components from damage during or following extreme conditions. For example, it is envisaged that at least an appropriate circuit breaker will be included in each line.

Hereinafter, it should be assumed that references to components being connected or connections between components comprise suitable feeder or transmission lines as described above unless it is otherwise indicated.

A Power Plant Controller (PPC) 40 is connected to the power network at a Point of Measurement (PoM) 42 and is also connected directly to the WPP 12. The role of the PPC 40 is to act as a command and control interface between the WPP 12 and the grid 16, and more specifically, between the WPP 12 and a grid operator or transmission system operator (TSO) 44. The PPC 40 is a suitable computer system for carrying out the controls and commands as described above and so incorporates a processing module 46, a connectivity module 48, a memory module 50 and a sensing module 52. The PPC 40 may also receive information regarding the grid 16 and/or the local buses, substations and networks from an energy management system (EMS) 54. For example, the EMS 54 is able to identify the status of protection systems throughout the network 10.

The PPC 40 is connected to the transmission line 31 between the main transformer 24 and the PoI bus 30 at the PoM 42 to allow monitoring and regulation of the output of the WPP 12 and to interpret the power demands correctly. The PPC 40 is also connected to the medium voltage bus 22 to measure a variety of parameters that are representative of the state of the grid 16 and WPP 12, and that can be used to improve the outputs of the WPP 12 to best meet the requirements of the TSO 44 or as set out in a set of grid-specific requirements.

In its role, the PPC 40 interprets the power delivery demands requested of it by the TSO 44 or required of the WPP 12 according to a set of grid requirements that are specific to the main grid 16. The PPC 40 manages the wind turbines 14 in the WPP 12 in order to satisfy those requirements, whilst taking into account other operative factors such as grid faults and sudden changes in output or measured grid voltage.

The PPC 40 measures parameters of the power output such as a frequency and voltage, as well as reactive and active power exchange between the WPP 12 and the main grid 16, and the voltage level of the main grid 16. The PPC 40 compares the measured parameters against specific grid requirements and, in a suitable manner, communicates control commands to specific components of the WPP 12 accordingly. The WPP 12 is capable of altering its power or voltage output in reaction to commands received from the PPC 40.

As discussed above, the PPC 40 manages the WPP 12 according to a set of grid requirements that are specific to the main grid 16. Specific circumstances require different modes of operation. In particular, the operation of the PPC 40 and WPP 12 in reaction to a grid fault is especially important and requires careful control of voltage and power outputs to support the grid 16 and enable an efficient recovery to normal operating levels.

As will be understood by the skilled person, a grid fault is generally defined as a period in which the voltage level of the grid 16 or wider power network drops to a level outside the accepted and normal operational bounds. During a grid fault, the PPC 40 operates the WPP 12 in a low-voltage ride through (LVRT) mode to avoid disconnection of the WPP 12 from the grid 16 and to support the grid 16 through the fault. If the WPP 12 is disconnected from the grid 16, it will be more difficult for the grid 16 to recover from the fault due to the loss of voltage generation that it received from the WPP 12. In the LVRT mode, the PPC 40 and WPP 12 support the grid 16 during the fault by supplying reactive power to encourage a rise in voltage levels. The WPP 12 is required to supply reactive power until the voltage levels have returned to levels that are within a normal operating band. In many circumstances, this operating band is between voltage levels of 0.9 pu to 1.1 pu.

Furthermore, the requirements of the grid 16 may specify that the WPP 12 is required to continue supplying reactive power to the grid 16 for a period following the recovery of the grid 16 to the normal operating band. Typically, this is achieved by operating the WPP 12 in a 'voltage control mode' in which the PPC 40 issues commands to the WPP 12 to supply reactive power so that a predetermined reference voltage level is achieved at the PoI 30.

Typically, when the grid 16 is operating well within its design limits, the normal operating conditions of the grid 16 are re-attained following a fault. In addition, the recovery of the grid 16 results in the voltage level of a PoI bus 32 associated with the WPP 12 returning to a 'natural voltage level', which will be close to the normal operational levels (around 1 per unit voltage (pu)) of the grid 16 irrespective of power exchange. The natural voltage level of the PoI bus 32 can be considered to be a normal equilibrium point of the system, and is defined as the voltage level at which the grid 16 and PoI bus 32 would resolve to for a given active power exchange, and for zero reactive power exchange.

As would be understood by the skilled person, per-unit voltage is an expression of the voltage with respect to a base value which is used as a reference. Using a per-unit system allows for normalization of values across transformers and other components that may change the value by an order of magnitude.

The predetermined reference voltage level used by the PPC 40 in voltage control mode is a fixed value and is chosen to be close to the natural voltage level of the grid 16 and PoI bus 32, with an allowable operating band specified to avoid unwanted exchange of reactive power for small changes in voltage levels. So, when the grid 16 operates within its design limits, the fixed value for the reference voltage level allows the correct voltage conditions to be realised quickly following a fault.

Operation in voltage control mode ensures a stable recovery of the grid 16, providing the grid 16 is operating within its design limits. However, where the grid 16 is operating close to or at its design limit, the grid 16 has a low fault level and a 'weak grid interconnection' exists or may occur following a fault. In these circumstances, the supply of voltage and power at the PoI bus 32 is volatile and small exchanges in reactive or active power at the PoI bus 32 may result in large fluctuations of grid voltage. Weak grid interconnections occur most often in remotely located facilities where insufficient infrastructure is provided, resulting in a high likelihood that the design limit will be reached.

Where a weak grid interconnection exists following a fault, changes in the generation capabilities of the grid 16 and the volatility introduced by the weak grid interconnection mean that the conditions of the grid 16 will be different to the pre-fault conditions. Consequently, the new natural voltage level of the grid 16 tends to be significantly higher than the pre-fault natural voltage level of the grid.

However, the reference voltage level stored within the PPC 40, and which the WPP 12 uses in voltage control mode to support the grid 16 following the fault, is locked to a level that is based on the pre-fault natural voltage level of the grid 16. As such, the PPC 40 operates the WPP 12 to meet a lower voltage level requirement than the grid 16 has naturally settled at following the fault. In other words, the WPP 12 alters reactive power exchange at the PoI bus 32 so that the voltage measured at the PoM 42 is lower than the current operational level of the grid 16. Put another way, the voltage level achieved at the PoI bus 32 by the action of the WPP 12 is mismatched to the voltage level required to support the continued operation of the grid 16.

However, as the grid 16 has a natural voltage that is higher than the reference voltage used by the WPP 12, the PoI bus voltage level increases from the reference voltage level towards the equilibrium level of the higher natural voltage once the reference voltage level has been achieved.

The PPC 40 registers this increase and in turn controls the WPP 12 to consume reactive power to lower the voltage level to the reference voltage level. The process then repeats, with the PPC 40 controlling the WPP 12 to lower the PoI bus voltage level, and the grid 16 raising the PoI bus voltage level back to its equilibrium level.

So, when operated in voltage control mode following a fault, a WPP 12 forming part of a power system 10 having a weak grid interconnection achieves a voltage output level that corresponds to achieving a reference voltage level at the PoI bus 32. The reference voltage level is specified and fixed by the PPC 40 and corresponds to pre-fault conditions. The grid 16 has a natural voltage level that is higher than the reference voltage level, and as the natural voltage level is a desired equilibrium, the voltage level of the PoI bus 32 will rise until it is equal or substantially similar to the natural voltage level. This occurs due to the changes in reactive power exchange required by the grid 16 when the voltage level of the PoI bus 32 is measured to be different to the natural voltage level respectively. When a grid controller such as the TSO 44 identifies that the voltage level is below where it should be, it demands reactive power supply, which raises the voltage of the grid 16 and PoI bus 32 to the natural voltage level. Once the natural voltage level has been reached, the reactive power supply is maintained at that level. The reactive power supply by the grid 16 counteracts the absorption by the WPP 12 that is commanded by the PPC 40, bringing the reactive power exchange level back to zero reactive power exchange.

As part of its routine monitoring under voltage control mode, the PPC 40 identifies this rise in voltage away from the fixed reference voltage level and in turn commands the WPP 12 to increase consumption of reactive power to lower the voltage level at the PoI bus 32. Once the PoI bus voltage level has returned to the reference voltage level, the WPP 12 is commanded to maintain the reference voltage level. The voltage level then begins to rise again towards the natural voltage level of the grid 16, and so the process repeats.

Figure 2A:
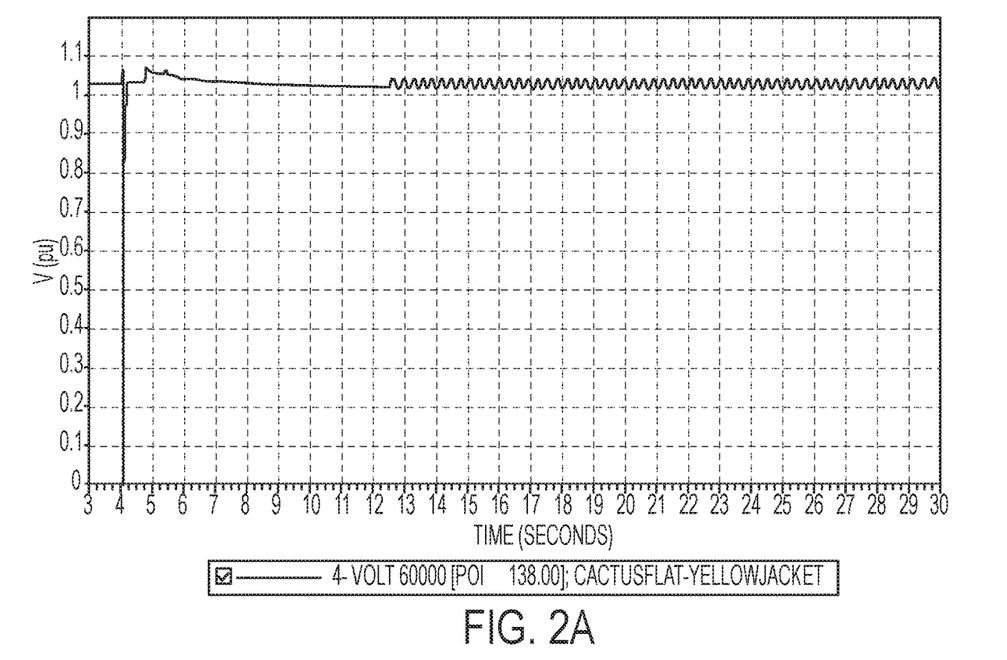
FIGS. 2a and 2b are charts outlining oscillations in voltage and power outputs respectively from a wind power plant operating according to a known methodology.

As the reference voltage level is fixed, the PoI bus voltage level fluctuates between the natural voltage level and the reference voltage level. This leads to an oscillating PoI bus voltage level in which a 'push-pull' phenomenon occurs between the PPC 40 and the grid 16. This push-pull phenomenon between the plant controller and grid is known as "Manoj Effect". An example of this phenomenon is shown in FIG. 2a. FIG. 2a is a simulation, and the oscillations are depicted from approximately 12.5 seconds onwards.

The oscillations in the PoI bus voltage level require changes in reactive power exchange at the PoI bus 32. The efforts of the WPP 12 to reduce the voltage level mean that it must continually consume more reactive power from the grid 16, while the grid 16 attempts to return the reactive power exchange at the PoI bus 32 to zero so as to raise the voltage level. Active power output is also affected by the changes in voltage, and oscillates in a similar manner due to the relationship between active power, voltage, current and phase angle.

Figure 2B:
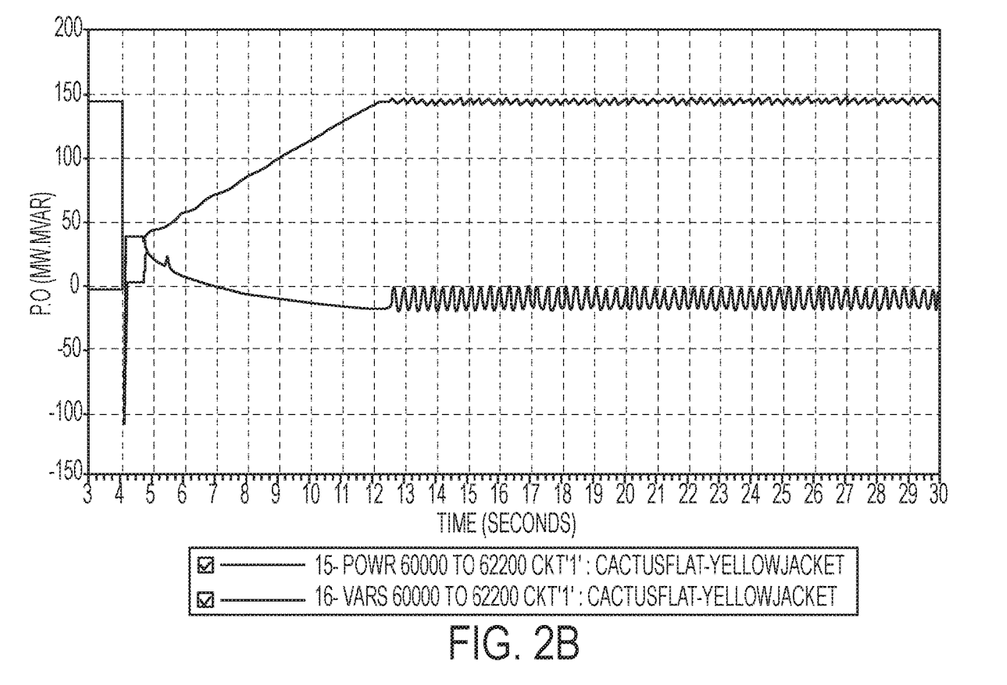

FIG. 2b shows the oscillations of active and reactive power in response to the oscillations shown in FIG. 2a. The uppermost line of FIG. 2b is for active power, with the lower line depicting the oscillation of reactive power with respect to time.

Continued oscillation of this kind may eventually bring the voltage to an unsustainable level, and lead to the LVRT mode triggering (in which the WPP keeps entering and exiting from the LVRT mode) or a disconnection of the WPP 12 from the grid 14.

Therefore, a method of detecting situations in which such oscillations are likely to occur is useful in allowing the system to act to avoid them. In addition, the system must then implement a method to reduce, eliminate, or avoid the oscillations.

PoI Bus Voltage Oscillation Determination

A number of techniques for detecting situations in which such oscillations are likely to occur at the PoI bus 32 are presented below and described in relation to FIGS. 1 to 3. Initially described is identification of such oscillations using measurement of a short-circuit ratio associated with the medium voltage bus 22. The identification of oscillations using the operational status of protection systems within the network 10 is then outlined, with the use of phase differences between buses of the network 10 to identify the oscillations detailed following that.

1. Short-Circuit Ratio (SCR)

A SCR for the network 10 can be determined. Typically, the SCR is determined at the medium voltage bus 22. The SCR can be calculated in real-time by measuring the voltage level change for a given reactive power change at the medium voltage bus 22 and the SCR is given as the ratio of this reactive power change to the voltage level change. These values are typically sampled over a short sampling window.

Once the SCR has been determined by the PPC 40, it is compared to a pre-set threshold value. If the SCR falls below the threshold, the PPC 40 identifies a weak grid condition and activates an emergency control mode for avoiding oscillations as described above. Emergency control modes will be discussed in more detail below.

In some embodiments, the threshold SCR value for entering the emergency control mode is 3.0. In other embodiments, the threshold value is less than 3. For example, the threshold may be a value between 3.0 and 2.5. In exceptional circumstances, the threshold value may be lower than 2.5.

2. Protection System Status

Protection systems, in the form of circuit breakers, are installed in transmission lines connecting components in the network 10 to allow protection of the components when and if necessary. It will be appreciated that other, known protection systems may be incorporated into the network.

The operational status of the protection systems installed within the network 10 may be used to identify the presence of potentially unstable grid conditions, and in particular, a weak grid interconnection that may lead to oscillation in voltage level.

For example, considering only circuit breakers, the EMS 54 is able to update the PPC 40 with the status of each circuit breaker incorporated into each transmission line in substations forming part of the main grid 16. The PPC 40 can then determine if a weak grid interconnection exists if particular circuit breakers are open or if particular combinations of circuit breakers are open. If this is identified, the PPC 40 will operate the WPP 12 in an emergency control mode.

3. Phase Difference

The PPC 40 may be configured to compare measured voltages to establish a voltage phase angle. This phase angle corresponds to the amount by which one measured voltage level leads or lags another measured voltage level, measured at a different measurement position within the network 10.

The phase angle can be measured by the PPC 40 at each of a number of buses within the network 10, or is configured to receive measurements made by power management units (not shown in FIG. 1) associated with the buses.

For example, to determine that a weak grid interconnection exists, the PPC 40 calculates the phase angle difference between the voltage level measured at the PoI bus 32 and the voltage level measured at a bus forming part of the main grid, i.e. the substation feeder bus 38 shown in FIG. 1. The PPC 40 compares the phase angle difference to a predetermined threshold or plurality of thresholds to establish whether a weak grid interconnection exists and whether it is likely that voltage oscillations will occur. The magnitude of the phase angle difference will be greater if there is a higher likelihood of oscillations. Once it has been established that a weak grid interconnection exists and/or that there is a high likelihood of voltage oscillations at the PoI bus 32, the PPC 40 operates the WPP 12 in an emergency control mode.

4. Gradient of Relative Changes in Parameters

The PPC 40 may be configured to identify changes of parameters over predefined sampling periods, and to compare these against one another to identify a weak grid interconnection.

For example, the ratio of voltage change to phase angle change over specific periods may be used to identify a weak grid interconnection. As in section 3 above, phase angle here is considered to mean the difference in angle between two voltage signals measured at different buses within the system.

When a 'strong grid', i.e. one in which voltage oscillations are unlikely, is present, there are low voltage variations with respect to phase angle changes. A weak grid interconnection will result in high variation of voltage for low phase angle changes.

Similarly, it is also possible to use the ratio of voltage change to active power change within the system to identify a weak grid interconnection.

Sampling of these parameters can be performed very quickly, in some cases as fast as or greater than 10 Hz. It is envisaged that in most embodiments, the sampling rate will be between 0.1 Hz and 1 Hz.

5. Combination of the Above Techniques

In some embodiments, more than one of the above techniques for identification may be combined to determine a weak grid interconnection.

Emergency Control Modes

Following identification or determination of a weak grid interconnection, and that voltage oscillations are likely, the PPC 40 operates the WPP 12 according to an emergency control mode. The emergency control mode acts to reduce or avoid voltage oscillations at the PoI bus 32 that occur where weak grid interconnections exist. Two methods for reducing or avoiding the oscillations are described below in relation to FIGS. 4 and 5. The first method 100 utilises previously measured data to avoid oscillations at the PoI bus 32, while the second method 200 outlines an adaptive voltage control mode.

1. Use of Previously Measured Data

For each technique described above for determining that voltage oscillations at the PoI bus 32 are likely, data measured by the PPC 40 during the determination may be used to populate a look-up table.

Using the above techniques the PPC 40 either calculates the SCR or phase difference, or determines the circuit breakers statuses at regular intervals. For each calculated value or determined status, the corresponding values for active power output and natural voltage are calculated at the PoI bus 32 and recorded in the look-up table.

For example, considering calculation of the SCR, a look-up table as shown below in table 1 may be formed.

TABLE 1

| SCR | $P_{PoI}$ (pu) | $Q_{PoI}$ (pu) | $V_{PoI}$ (pu) |
|---|---|---|---|
| SCR1 | P11 | 0 | V11 |
|  | P12 | 0 | V12 |
|  | P13 | 0 | V13 |
| SCR2 | P21 | 0 | V21 |
|  | P22 | 0 | V22 |
|  | P23 | 0 | V23 |
| SCR 3 | P31 | 0 | V31 |
|  | P32 | 0 | V32 |
|  | P33 | 0 | V33 |

The look-up table incorporates a plurality of SCR values, and for each SCR values, a plurality of entries for active power output ($P_{PoI}$) and natural voltage ($V_{PoI}$) at the PoI bus 32. These measurements are made for zero reactive power exchange. Therefore, when the grid 16 is operating in a stable manner, the expected relationship between active power output and natural voltage is known. The look-up table is also populated for weak grid interconnections during normal operation (i.e. not following a fault).

Similar look-up tables are also populated where protection system status and phase angle difference replace the SCR values.

Following a fault and the identification that a weak grid interconnection exists, the PPC 40 automatically operates the WPP 12 in the emergency control mode according to a predetermined preference. The predetermined preference may be chosen by a user or operator or may be determined from a hierarchy that is set during system set-up. Thus, if, for example, the user has indicated that the emergency control mode should take into account the SCR value measured at the medium voltage grid, the corresponding look-up table is recalled from the PPC memory module 50. The SCR of the medium voltage bus 22 is measured by the PPC 40 and the correct natural voltage for the active power output determined from the look-up table. The reference voltage level of the PPC 40 is set to equal the corresponding $V_{PoI}$ for the instantaneous active power output at the PoI 30.

Figure 3:
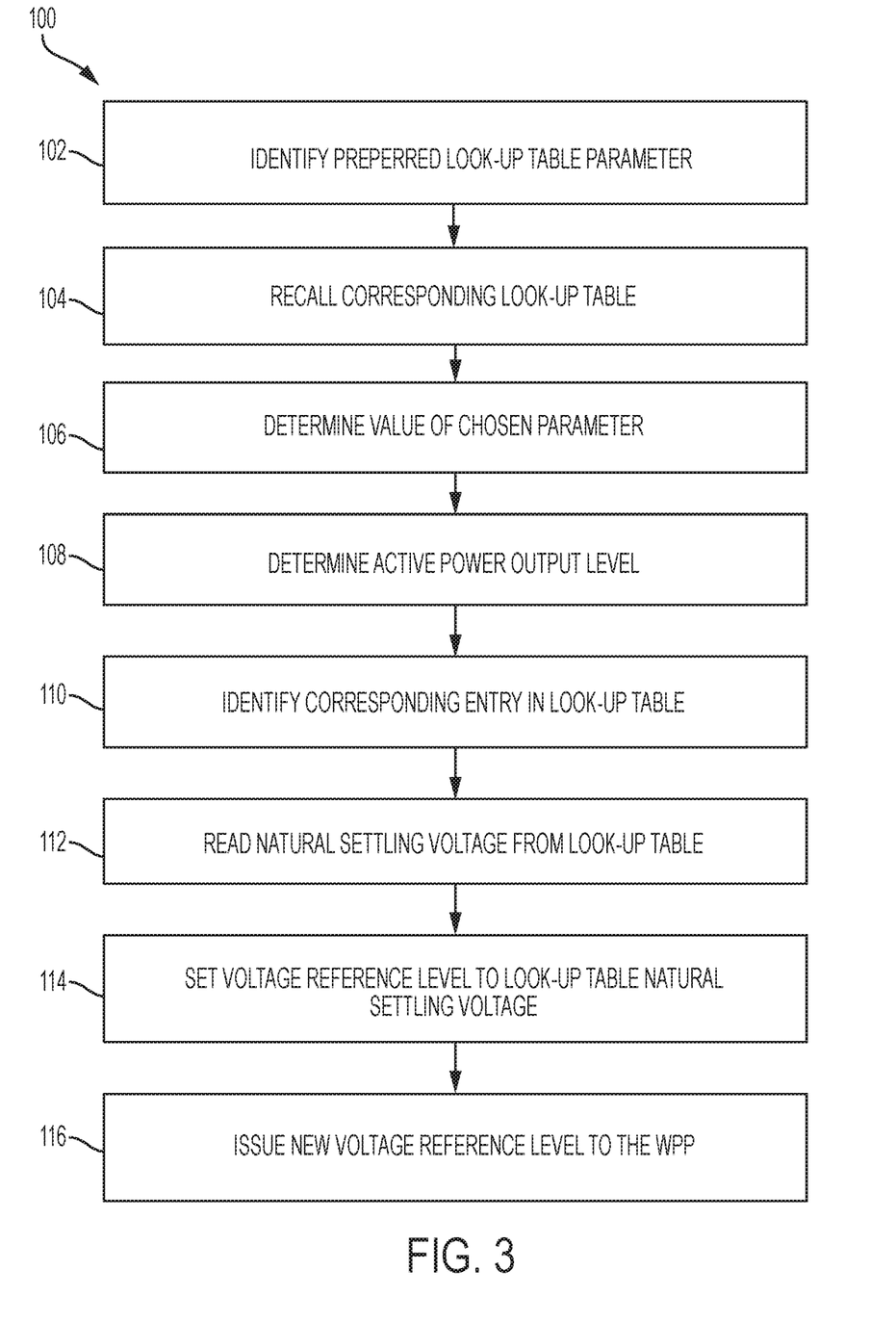
FIG. 3 is a flow chart illustrating a process governing the identification of a weak interconnection between the power network and the wind power plant.

FIG. 3 illustrates a general method 100 that is followed by the PPC 40 once the emergency control mode is entered.

Initially, the PPC 40 identifies 102 the preferred parameter on which the emergency control mode should be based. This specifies the look-up table that will be used to establish the new value for the reference voltage level. Different parameters may be more effective than others under different scenarios, or may not be available in some circumstances. Therefore, the most appropriate value is selected.

The PPC 40 then recalls 104 the look-up table corresponding to the parameter. The value of the parameter and the active power output level are then determined 106, 108, and the corresponding entry in the look-up table is identified 110.

From the entry that has been identified 110, the PPC 40 reads 112 the suggested natural voltage that has been previously achieved for the given parameter value and active power output level.

The PPC 40 sets 114 the reference voltage level to equal the suggested natural voltage in the look-up table and this reference voltage level is finally issued 116 to the WPP 12.

The method 100 can be repeated from the first determination step 106 to ensure that the correct natural voltage is achieved even if the grid conditions change. If the method 100 is repeated, the method 100 may be stopped once a predetermined time threshold is reached, a predetermined number of iterations have occurred, if the change between each iteration is below a predetermined threshold or at any other user-defined point. Other end conditions to those suggested here may be defined based upon the requirements of the user or system, or a plurality of potential end conditions may be combined.

In this emergency control mode, the voltage deadband is set to be sufficient to ensure that the PPC 40 is not overly sensitive.

In some embodiments of this method, a maximum active power output limit is specified for the WPP 12 so that the operating voltage at the PoI 30 does not exceed 1.1 pu while reactive power exchange is 0.

2. Adaptive Voltage Control Mode

The PPC 40 may also operate the WPP 12 in a second emergency control mode referred to here as the 'adaptive voltage control mode'.

Figure 4:
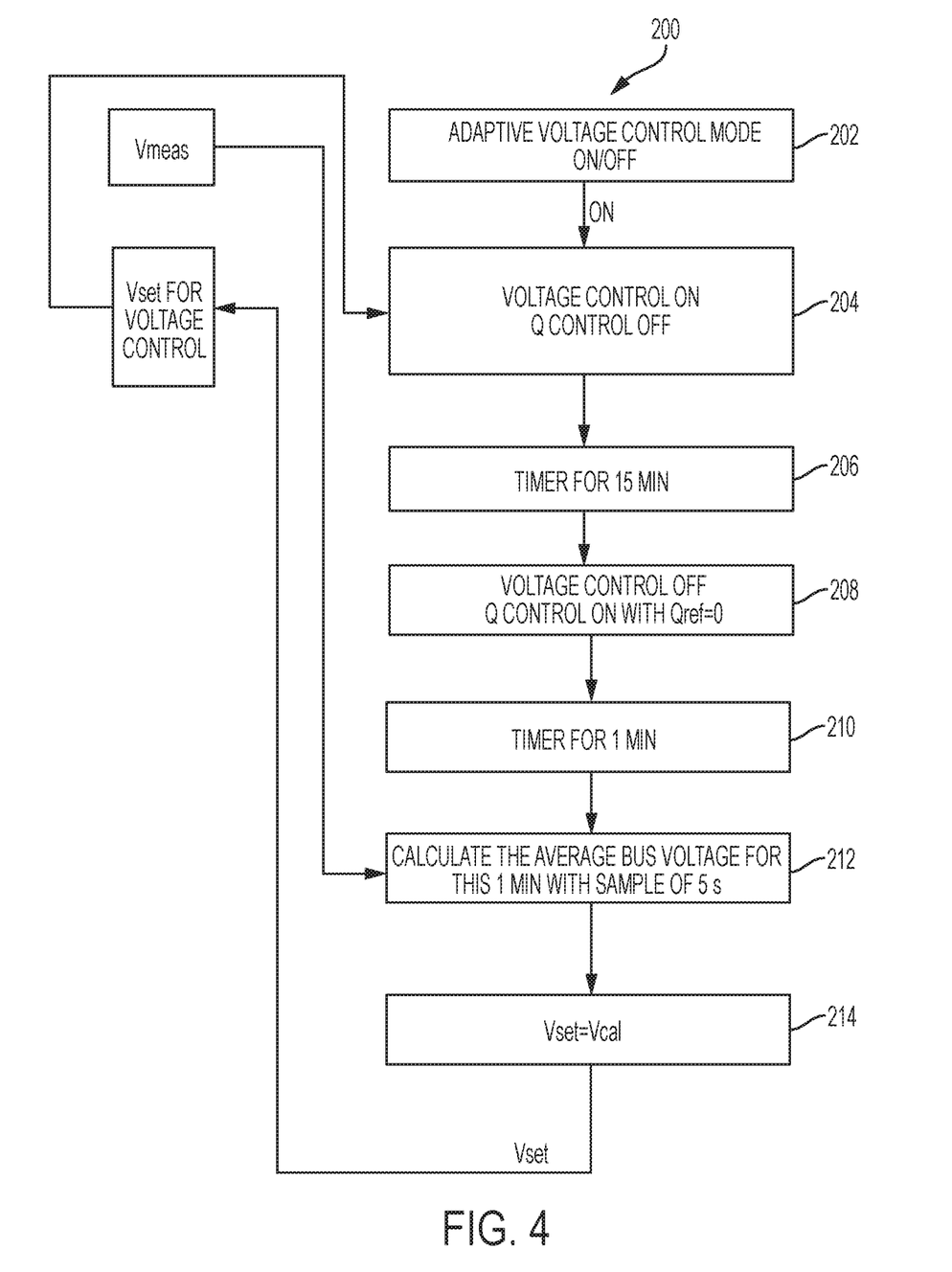
FIG. 4 is a flow chart illustrating a process governing the operation of the wind power plant in an adaptive voltage control mode according to an embodiment of the invention.

FIG. 4 shows a flow chart governing the operation of a WPP 12 in adaptive voltage control mode according to an embodiment of the invention. The method 200 shown in FIG. 4 is carried out automatically by the PPC 40 immediately upon identification of a condition that may cause oscillations of the type described above. The method 200 shown in FIG. 4 is specifically designed for reducing oscillations following a grid fault and is begun once the system has exited a low-voltage ride through mode.

Initially, once the PPC 40 has entered 202 adaptive voltage control mode, the WPP 12 is controlled 204 to operate in a 'voltage control' state. When this voltage control state has been entered 204, the WPP 12 is operated to achieve the reference voltage level, Vset, at the PoI bus 32. Vset is specified by the PPC 40. The WPP 12 is controlled to alter its output to achieve the reference voltage level regardless of reactive power exchange.

The WPP 12 is operated in the voltage control state for a first time period. In this case, the first time period, which is user-defined, is 15 minutes, and this period is monitored 206 using a timer incorporated into the PPC 40 or by a local processor (not shown in FIG. 1) of the WPP 12.

The operation of the WPP 12 in the voltage control state allows the voltage levels of the grid 16 to recover to normal or near-normal levels, and for any transient activity related to the grid fault to subside. During this period, the voltage of the grid will settle to its new natural voltage level.

Once this timer indicates that the first time period has elapsed, the operation of the WPP 12 is changed, and is subsequently operated 208 in a 'reactive power control' state for a second time period. Known bumpless transfer protocols may be used to switch seamlessly between the voltage control and reactive power control states. For the avoidance of doubt, it should be noted that bumpless transfer is a standard approach in control systems engineering and would be well understood by the skilled person.

In the reactive power control state, the output of the WPP 12 is varied to achieve a target reference reactive power exchange level, Qref, at the bus 32. The target exchange level is specified by the PPC 40 to be 0 MVar, i.e. no reactive power exchange. The WPP 12 operates in the reactive power control state for the second time period, which is 1 minute in the embodiment shown in FIG. 4. The second time period is monitored 210 by a timer.

Once the second time period has begun, the voltage of the PoI bus 32 is sampled and the average PoI bus voltage level for the second time period is calculated 212. The samples are taken across the second time period and the length of each sample is a predetermined value. For the second time period of 1 minute shown in FIG. 4, the sample length is 5 seconds, although this is just an example.

The calculation 212 of the average bus voltage is performed by taking the RMS value of the voltage signal obtained for each sample window and taking a mean of the RMS values. Other averaging means would be apparent to the skilled person.

Operating the WPP 12 in the reactive power control state, and more specifically, operating the WPP 12 to achieve 0 MVar reactive power exchange at the PoI bus 32 ensures that the bus voltage settles to the new natural voltage level of the grid 16 rather than the pre-fault voltage set point that the PPC 40 is configured to achieve.

Thus, operating the WPP 12 so that no reactive power exchange takes place means that the voltage at the PoI bus 32 is close to the new natural voltage level of the grid 16. Therefore, averaging the bus voltage to remove any transient events or events associated with the post-fault operation of the grid results in an average bus voltage level that is much closer to the natural voltage level of the power network than the pre-fault level that the PPC 40 would ordinarily be working towards. The average level that results is the nearest possible level to the actual natural voltage of the grid that can be calculated online and in real time.

Therefore, at the next step 214 of the method 200 of FIG. 4, the reference voltage level, Vset, is overwritten to be equal to the calculated average bus voltage, and the process returns to the step 204 of operating the WPP 12 in voltage control state with the target voltage level being equal to the calculated average bus voltage.

Figure 5A:
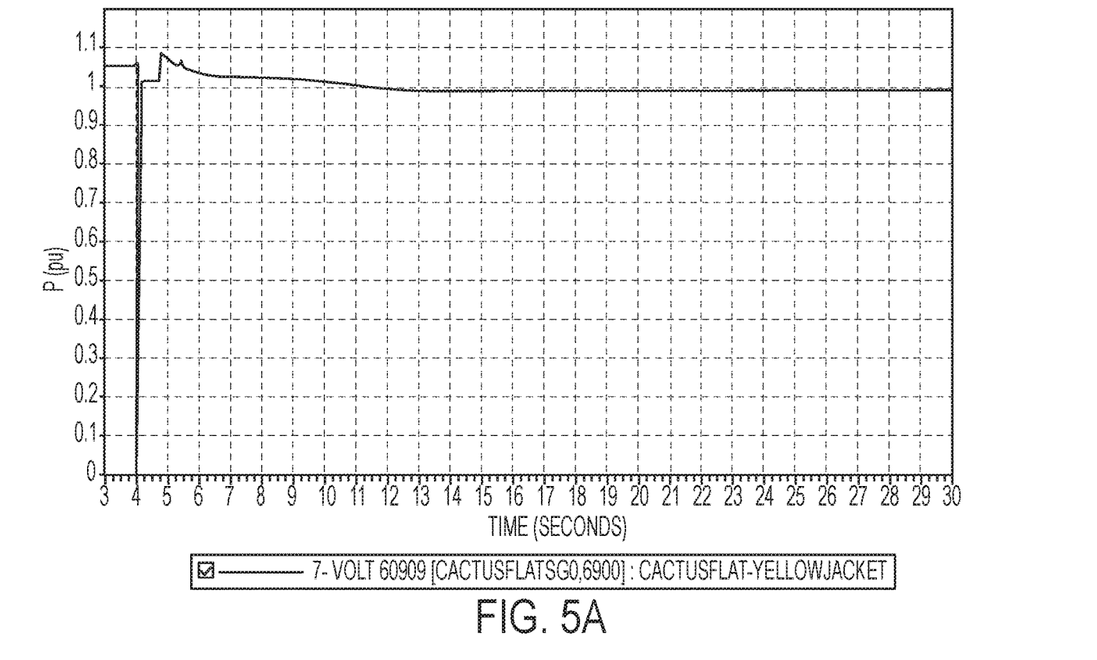
FIGS. 5a and 5b are charts outlining respective voltage and power outputs from the wind power plant when it is operated according to the method outlined in FIG. 4.
Figure 5B:
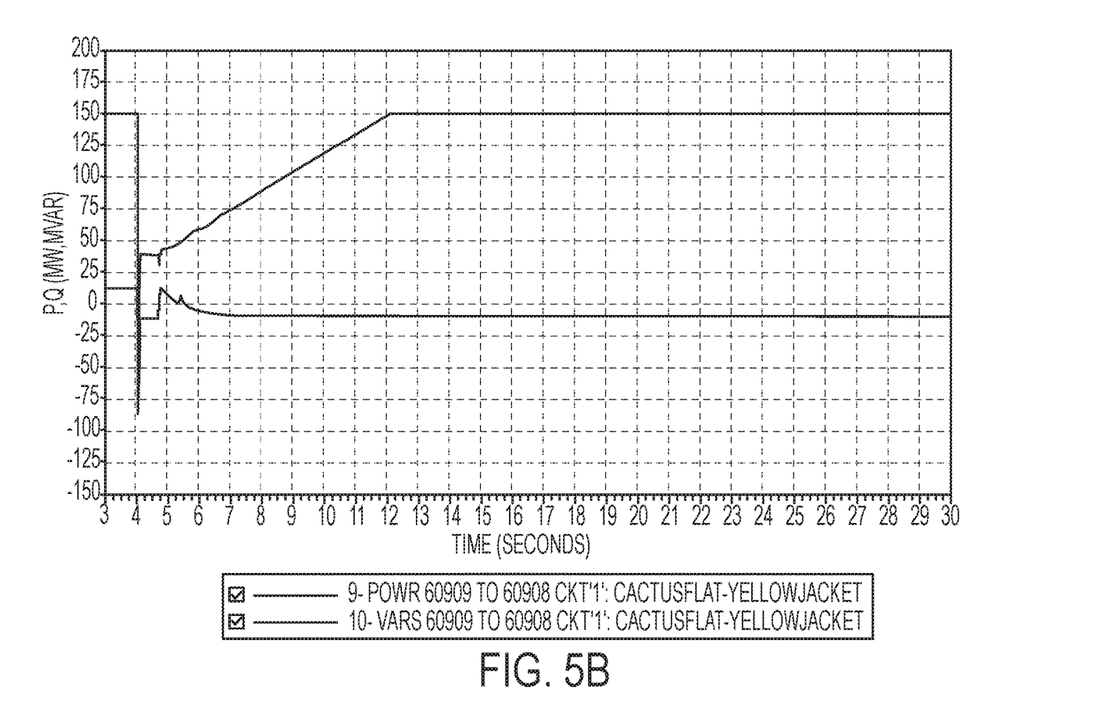

Returning to operating 204 the WPP 12 in the voltage control state and repeating the method produces an iterative process by which the WPP 12 is able to reduce the difference between its target voltage level and the natural voltage level of the grid 16. Reducing the difference between these values yields smoother voltage, reactive power and active power levels of the bus, and eliminates the likelihood of oscillations due to the 'push-pull' phenomenon described above. The results of using the method 200 of FIG. 4 on an example signal is shown in FIG. 5*a* for voltage levels and FIG. 5*b* for active power and reactive power levels.

The way in which the method 200 of FIG. 4 ends may be the occurrence of a user-determined end condition, a predetermined end condition, or the first to occur of a number of end conditions. The PPC 40 is configured to monitor for the presence of the selected end condition or conditions. In one embodiment, the PPC 40 would incorporate an overall time threshold, being at least as long as the first and second time period together, but preferably longer. The overall time threshold would be measured from initiation of the adaptive voltage control mode and would last until at least the first equation of Vset with the calculated voltage level of the bus. It is likely that the time threshold would be at least double the length of one iteration to allow a better approximation to the new natural voltage of the power network to be obtained. In many circumstances, the time threshold may be longer than this.

After the time threshold has been reached, the PPC 40 would return to stop operating the WPP 12 in the adaptive voltage control mode according to the method 200 of FIG. 4, and may begin operating the WPP 12 in a normal operating mode such as in the voltage control state only, or in another contingency mode.

Similarly, the PPC 40 may stop operating the WPP 12 in adaptive voltage control mode after a predetermined number of iterations.

Alternatively, the PPC 40 may also regularly calculate the SCR of the system to check whether a weak grid interconnection still exists. If the SCR is above a threshold value, the PPC 40 may stop operating the WPP 12 in adaptive voltage control mode. The upstream phase difference and/or circuit breaker status may also be used to judge when the PPC 40 is no longer required to operate the WPP 12 in adaptive voltage control mode. The method 200 may also end following a command received from the TSO 44.

In other embodiments, the method 200 may incorporate an additional step prior to the step of overwriting the previous value of the target reference voltage level i.e. between steps 212 and 214. This additional step would comprise calculating the difference between Vset and the calculated average bus voltage. As the Vset values approach the natural voltage level of the grid 16, the difference between these values should reduce to 0. If it is calculated that the difference between Vset and the average bus voltage is within a range of predetermined allowable values, then the PPC 40 will stop operating the WPP 12 in the adaptive voltage control mode.

It will be appreciated that while these end conditions are described in relation to iteratively operating the WPP in adaptive voltage control mode according to the method 200 of FIG. 4, they are equally as applicable to the emergency control mode method 100 of FIG. 3.

Figure 6:
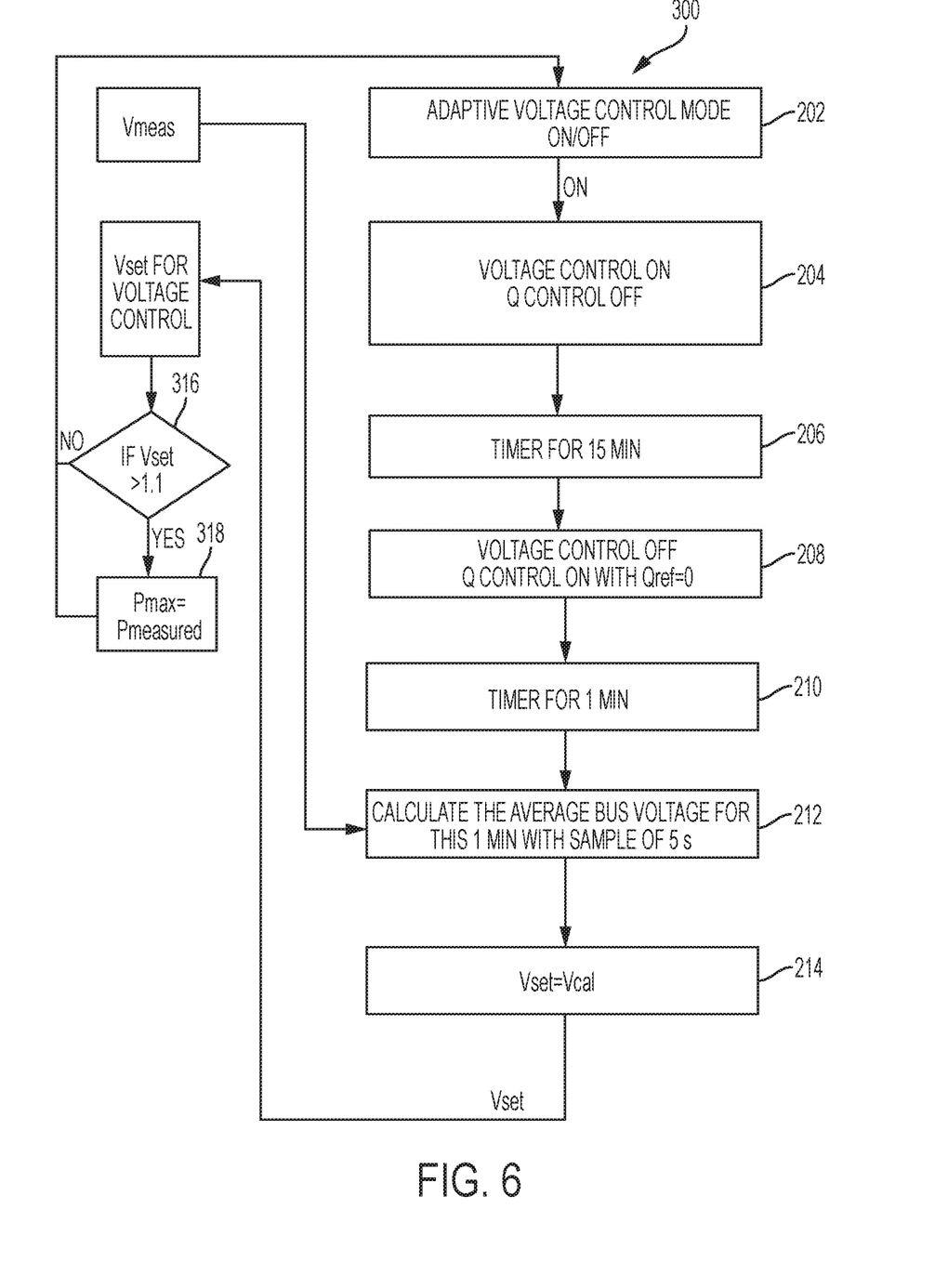
FIG. 6 is a flow chart illustrating an alternative embodiment of the flow chart of FIG. 4.

FIG. 6 illustrates an alternative embodiment of the adaptive voltage control mode. The method 300 of this embodiment includes two further steps. Following determination 214 of the new voltage reference level, Vset, this level is compared 316 with a predetermined threshold. In this case, the threshold is 1.1 pu. If Vset is greater than 1.1 pu, or greater than the threshold if different, a maximum active power output level, Pmax, is set 318 as being equal to the measured active power output level at that time, Pmeasured. The method 300 then repeats with Vset as the new voltage reference level as previously described. If Vset is less than the threshold, no maximum active power output level is set but the method 300 repeats as normal with Vset as the new voltage reference level.

These extra steps 316, 318 ensure that the grid 16 and the WPP 12 are kept within safe operational limits of voltage levels between 0.9 pu and 1.1 pu as discussed above. Subsequently, until the voltage level of the grid 16 reduces to a level of 1.1 pu or lower, the maximum output active power level of the WPP 12 will be curtailed to meet this maximum value, thereby preserving the stability of the grid 16.

In some embodiments, the first time period, second time period, and/or sampling windows may be shortened with increasing repetitions of the method. This would shorten the time necessary for a good approximation to the natural voltage level of the power network to be achieved, reducing the oscillations to a minimum.

In some embodiments, adaptive voltage control mode may begin with the reactive power control state, i.e. the methods 200, 300 of FIGS. 4 and 6 may begin at step 208, before moving to the voltage control state later on if it is determined that a predetermined voltage condition has been achieved. In the case of the embodiment described in relation to FIG. 4, the predetermined voltage condition in this case would be that the WPP 12 has been operated in the voltage control state for the first time period.

In some embodiments, the PoM 42 may be positioned at a different position in the system such that the parameters measured by the PPC 40 are not representative of the actual values for those parameters at the PoI 30 and the values may differ by an order of magnitude or more. In this case, a correction factor may be applied to the measurements to adjust for the different position of the PoM 42 relative to the PoI 30.

It therefore does not matter where the PoM 42 with regard to the PoI 30, so long as there is a predetermined correction factor. Therefore, the measured voltage may be indicative of, or associated with, the voltage at the PoI 300, even if the voltage is not measured directly at that location.

The time for which the voltage control and reactive power control states are continued may be 15 minutes and 1 minute described above. It is envisaged that the WPP should be operated in these states for no longer than 15 minutes. In some embodiments, the operational times for each state may be 10 or 5 seconds. These correspond to sampling rates for averaging voltage levels of 0.1 Hz and 0.2 Hz respectively.

Many modifications may be made to the above examples without departing from the scope of the present invention as defined in the accompanying claims.

The invention claimed is:

1. A method of operating a renewable power plant that is connected to a wider power network by a bus, the method comprising:
identifying a predetermined voltage condition of the renewable power plant or of the bus;
performing an operation iteratively until an end condition is detected, wherein the operation comprises:
controlling the renewable power plant to maintain zero reactive power exchange at the bus for a first period;
calculating an average voltage level of the bus that was achieved during the first period; and
controlling the renewable power plant to maintain a voltage output at a set voltage level for a second period, the set voltage level being substantially equal to the calculated average voltage level, wherein a duration of the second period is reduced between a pair of consecutive iterations of the operation; and
reverting to a previous control mode when the end condition is detected.

2. The method of claim 1, further comprising identifying that a weak grid interconnection exists and performing the remaining steps of the method if a weak grid interconnection exists.

3. The method of claim 2, wherein the existence of a weak grid interconnection is identified based upon at least one of: a short circuit ratio of the bus; a status of at least one protection system associated with the power network; and a phase angle difference between two buses within the power network.

4. The method of claim 1, wherein the method is performed following a power network fault, and wherein identifying a predetermined voltage condition comprises controlling the renewable power plant to maintain the voltage output at a set voltage level for a third time period, the set voltage level being substantially equal to a pre-fault voltage level.

5. The method of claim 4, wherein the third time period and the second period are substantially similar.

6. The method of claim 1, further comprising at least one of the following:
calculating a difference between the set voltage level and an average calculated voltage of consecutive iterations and comparing the difference with a threshold range of values;
calculating a number of completed iterations and comparing the number with a predetermined iterations threshold;
measuring an elapsed time and comparing the elapsed time with a predetermined time threshold;
monitoring a parameter used to identify a weak grid interconnection; or
receiving commands to operate the renewable power plant in a different mode.

7. The method of claim 1 comprising measuring a plurality of voltage samples, each sample being measured over a pre-determined sample period, and wherein calculating the average voltage level is based on the plurality of voltage samples.

8. The method of claim 1, wherein the duration of the first period is shorter than the duration of the second period.

9. The method of claim 1 comprising comparing the set voltage level with a predetermined voltage threshold, and if the set voltage level is above the threshold, measuring an active power output of the renewable power plant and controlling the renewable power plant so that active power output remains below the measured active power output.

10. The method of claim 9, wherein the predetermined voltage threshold is 1.1 pu.

11. A power plant controller for a renewable power plant having a plurality of wind turbine generators and connected to a wider power network by a bus, wherein the controller comprises a processor, a memory, and an input/output system, and wherein the memory includes a set of program code instructions which when executed by the processor, implement an operation, comprising:
identifying a predetermined voltage condition of the renewable power plant or of the bus;
performing an operation iteratively until an end condition is detected, wherein the operation comprises:
controlling the renewable power plant to maintain zero reactive power exchange at the bus for a first period;
calculating an average voltage level of the bus that was achieved during the first period; and
controlling the renewable power plant to maintain a voltage output at a set voltage level for a second period, the set voltage level being substantially equal to the calculated average voltage level, wherein a duration of the second period is reduced between a pair of consecutive iterations of the operation; and
reverting to a previous control mode when the end condition is detected.

12. A method of operating a renewable power plant connected to a power network by a first bus, the method comprising:
identifying a predetermined condition of the power network;
performing an operation iteratively until the predetermined condition stops, wherein the operation comprises:
measuring an active power output of the renewable power plant;
identifying a predetermined natural voltage level of the power network that corresponds to the measured active power output; and
controlling the renewable power plant to maintain a voltage output at a set voltage level that is substantially equal to a natural voltage level for a period of time, wherein the period of time is reduced between a pair of consecutive iterations of the operation; and
reverting to a previous control mode when the predetermined condition stops.

13. The method of claim 12, wherein identifying a predetermined condition of the power network comprises determining at least one of: a short-circuit ratio; a phase angle difference between two buses forming part of the power network; and a status of at least one protection system associated with the power network.

14. The method of claim 13, wherein the two buses comprise a point of interconnection bus and a substation bus.

15. The method of claim 13, wherein the short-circuit ratio is determined at a medium voltage bus.

16. The method of claim 12 wherein identifying a predetermined natural voltage level of the power network that corresponds to the measured active power output comprises comparing the measured active power output to a pre-populated look-up table, identifying a corresponding entry in the look-up table and reading the natural voltage level of the power network based on the identified entry in the look-up table.

17. The method of claim 16 comprising determining a parameter selected from the following: a short-circuit ratio; a phase angle difference between two buses forming part of the power network; and a status of at least one protection system associated with the power network, and wherein identifying a predetermined natural voltage level of the power network that corresponds to the measured active power output comprises comparing the measured active power output and the determined parameter with the look-up table, identifying a corresponding entry in the look-up table and reading the natural voltage level of the power network based on the identified entry in the look-up table.

18. The method of claim 12, wherein the method is performed following a fault in the power network.

19. The method of claim 12, wherein the first bus is a point of interconnection bus.

20. A power plant controller for a power plant having a plurality of wind turbine generators, wherein the controller comprises a processor, a memory module, and an input/output system, and wherein the memory includes a set of program code instructions which when executed by the processor, implement an operation, comprising:
  identifying a predetermined voltage condition of the power plant or of a bus connecting the power plant to a wider power network;
  performing an operation iteratively until an end condition is detected, wherein the operation comprises:
    controlling the power plant to maintain zero reactive power exchange at the bus for a first period;
    calculating an average voltage level of the bus that was achieved during the first period; and
    controlling the power plant to maintain a voltage output at a set voltage level for a second period, the set voltage level being substantially equal to the calculated average voltage level, wherein a duration of the second period is reduced between a pair of consecutive iterations of the operation; and
  reverting to a previous control mode when the end condition is detected.

* * * * *